Patented Jan. 6, 1942

2,269,147

UNITED STATES PATENT OFFICE 2,269,147

DI (ARYL AMINO) ALKACYL AMIDE

Joseph B. Dickey and James G. McNally, Rochester, N. Y., assignors to Eastman Kodak Company, Rochester, N. Y., a corporation of New Jersey No Drawing. Application October 21, 1939,
Serial No. 300,661

4 Claims. (Cl. 260—557)

This invention relates to diarylamine compounds having the general formula:

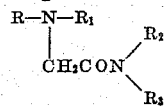

wherein R and $R_1$ each represents a member selected from the group consisting of a benzene nucleus, and a naphthalene nucleus, and in which at least one of the said nuclei must contain a nitro group, and $R_2$ and $R_3$ each represents a member selected from the group consisting of hydrogen, an alkyl group, and a hydroxyalkyl group. The nuclei may be further substituted by one or more monovalent substituents such as halogen represented by chlorine, bromine, and fluorine; a hydroxyl group; a sulphone group represented by sulphonamide, sulphonmethylamide, sulphondimethylamide, sulphone-β-hydroxyethylamide, sulphone - β - methoxyethylamide, and the like groups; an acid amide group of the type

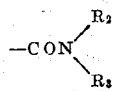

wherein $R_2$ and $R_3$ may represent hydrogen, alkyl, or hydroxyalkyl groups; an alkyl group represented by methyl, ethyl, butyl, cetyl, and similar groups; and the group

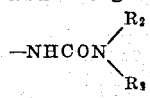

wherein $R_2$ and $R_3$ have the same meanings as above defined. Furthermore, $R_1$ may have an amino group, or a substituted amino group in position para to the nitrogen atom connecting the two aryl nuclei. It will be understood that by "hydroxyalkyl" group, we intend to include groups such as β-hydroxyethyl, β-hydroxypropyl, β,γ-dihydroxypropyl, ω-hydroxybutyl, and the like.

We have found that many of the members of the above described class of diarylamines are valuable dyestuffs for the coloration of textile materials. They produce brilliant yellow to orange colors on cellulose acetate which are fast to light and washing. It is an object of the invention, therefore, to prepare these compounds and to color organic derivatives of cellulose in the form of fibers, threads, yarns, and fabric materials therewith.

The methods of preparation of the nitrodiarylamine compounds of our invention are illustrated by the following examples.

Example 1

21.4 grams of o-nitrodiphenylamine are heated in butanol with 10.6 grams of sodium carbonate and 15 grams of chloroacetamide for a period of 6 hours, after which the salts are filtered off, and the dye recovered from the filtrate by crystallization, filtering, washing and drying. The dye compound obtained has the formula:

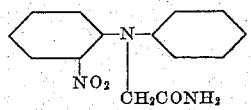

and colors cellulose acetate greenish-yellow shades from an aqueous suspension.

Example 2

19 grams of 4-nitro-1,2-dichlorobenzene, 10 grams of sodium carbonate, and 20 grams of phenyl glycine dimethylamide are heated to 160° C., and when the reaction is complete, the dye product is crystallized from ethanol, filtered off, washed and dried. The dye compound has the formula:

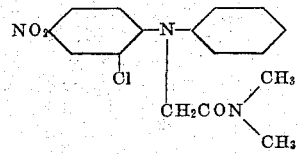

and colors cellulose acetate yellow shades from an aqueous suspension.

Example 3

21 grams of 2,4-dinitrochlorobenzene are heated with 20 grams of naphthyl glycine amide. The dye obtained has the formula:

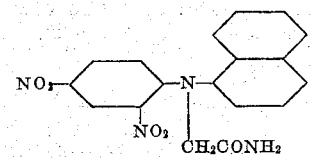

and colors cellulose acetate yellowish-orange shades from an aqueous suspension.

The invention is illustrated further by the following additional examples of diphenylamine compounds having a glycylamide group which may be prepared by the processes described in the preceding examples.

| Compound | Shade of color on cellulose acetate |
|---|---|
| ⌬-NH-⌬-NH-CH₂CONH₂ (with NO₂) | Yellow. |
| (complex structure with NO₂, Cl, CH₃, CH₂CONH₂, CH₂-CH₂COOCH₃) | Yellowish-orange. |
| (structure with NO₂ groups, C₂H₄OH, CH₂CON) | Orange. |
| NO₂-⌬-N-⌬-OH with CH₂CONH₂ | Do. |
| ⌬-N-⌬ with NO₂ and CH₂CONH₂ | Green-yellow. |
| NO₂-⌬-N-⌬-OH with OH, NO₂ and CH₂CONH₂ | Orange. |
| ⌬-N-⌬ with CONH₂, NO₂ and CH₂CONH₂ | Yellow. |
| NO₂-⌬-N-⌬ with SO₂NH₂ and CH₂CONH₂ | Do. |

In the application of the diarylamine compounds of our invention to the coloration of organic derivatives of cellulose, the dye is ordinarily applied from an aqueous suspension prepared by grinding the dye to a paste with a dispersing agent such as a soap, a sulfonated oil, or a higher fatty acid glyceryl sulfate, and then dispersing this paste in a suitable quantity of water. The material to be colored is immersed in the dispersion starting with a bath temperature of approximately 45–55° C., and then gradually increasing the temperature to 80–85° C., at which point it is maintained for several hours. Salt may be added to facilitate exhaustion of the dye bath during the dyeing operation. When the material has acquired the desired shade or condition of color, it is removed from the bath, washed with soap, rinsed and dried.

The following example illustrates how dyeing may be carried out in accordance with the invention. Quantities are expressed in parts by weight.

2.5 parts of

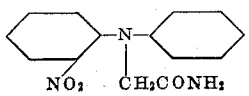

are ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath, after which the temperature is gradually raised to 80–85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a greenish-yellow shade of excellent fastness to light.

While our invention has been illustrated in connection with the dyeing of cellulose acetate silk, it will be understood that the same process is not limited exclusively to cellulose acetate or to the particular dye illustrated, but is likewise applicable for coloring organic derivatives of cellulose including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate - propionate, cellulose acetate - butyrate, and cellulose ethers such as methyl cellulose, ethyl cellulose, and benzyl cellulose.

We claim:

1. The non-sulfonated nuclear diarylamine compounds having the general formula:

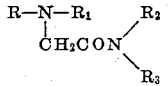

wherein the nuclei $R$ and $R_1$ each represents a member selected from the group consisting of a benzene nucleus, and a naphthalene nucleus, and in which at least one of the nuclei must be substituted by a nitro group, and $R_2$ and $R_3$ each represents a member selected from the group consisting of hydrogen, an alkyl group, and a lower hydroxyalkyl group.

2. The non-sulfonated nuclear diarylamine compounds having the general formula:

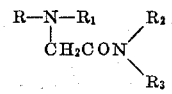

wherein $R$ represents a benzene nucleus, $R_1$ represents a member selected from the group consisting of a benzene nucleus, and a naphthalene nucleus, and in which at least one of the nuclei must be substituted by a nitro group, and $R_2$ and $R_3$ each represents a member selected from the group consisting of hydrogen, an alkyl group, and a lower hydroxyalkyl group.

3. The non-sulfonated nuclear diarylamine compounds having the general formula:

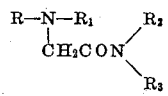

wherein $R$ represents a member selected from the group consisting of a benzene nucleus, and a naphthalene nucleus, and $R_1$ represents a benzene nucleus, and in which at least one of the nuclei must be substituted by a nitro group, and $R_2$ and $R_3$ each represents a member selected from the group consisting of hydrogen, an alkyl group, and a lower hydroxyalkyl group.

4. The non-sulfonated nuclear diarylamine compounds having the general formula:

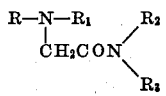

wherein the nuclei R and R₁ each represents a benzene nucleus, and in which at least one of the nuclei must be substituted by a nitro group, and R₂ and R₃ each represents a member selected from the group consisting of hydrogen, an alkyl group, and a lower hydroxyalkyl group.

JOSEPH B. DICKEY.
JAMES G. McNALLY.